United States Patent [19]

Goebel

[11] Patent Number: 5,418,958
[45] Date of Patent: May 23, 1995

[54] REGISTER ALLOCATION BY DECOMPOSING, RE-CONNECTING AND COLORING HIERARCHICAL PROGRAM REGIONS

[75] Inventor: Kurt J. Goebel, Los Gatos, Calif.

[73] Assignee: Sun Microsystems, Inc., Mountain View, Calif.

[21] Appl. No.: 914,860

[22] Filed: Jul. 15, 1992

[51] Int. Cl.$^6$ .......................... G06F 15/00; G06F 9/44
[52] U.S. Cl. ............................. 395/700; 364/DIG. 1; 364/247; 364/247.4; 364/260; 364/260.2; 364/280; 364/280.4; 364/280.5
[58] Field of Search ............. 395/700; 364/247, 247.4, 364/260, 260.2, 280, 280.4, 280.5

[56] References Cited

U.S. PATENT DOCUMENTS

| | | | |
|---|---|---|---|
| 4,435,753 | 3/1984 | Rizzi | 395/700 |
| 4,571,678 | 2/1986 | Chaitin . | |
| 4,782,444 | 11/1988 | Munshi et al. | 364/300 |
| 5,261,062 | 11/1993 | Sato | 395/375 |
| 5,339,428 | 8/1994 | Burmeister et al. | 395/700 |

OTHER PUBLICATIONS

ACM Transactions on Programming Languages and Systems; vol. 11, No. 1, Jan. 1989, New York, U.S., pp. 1-32, XP319429; Peter A. Steenkiste et al.: 'A Simple Interprocedural Register Allocation Algorithm and Its Effectiveness for LISP', *abstract* *p. 11, line 26–line 42* *p. 12, line 26–line 40*.
Proceedings of the 1992 International Conference on Computer Languages; 20 Apr. 1992, Oakland, Calif., U.S., pp. 262-271, XP325885; Angelika Zobel: 'Program Structure as Basis for Parallelising Global Register Allocation', *abstract* *p. 262, right col., line 12–p. 263, left col., line 12*.
David Callahan and Brian Koblenz, Register Allocation Via Hierarchical Graph Coloring, Proceedings of the ACM SIGPLAN '91 Conference on Programming Language Design and Implementation, Toronto, Ontario, Canada, Jun. 26-28, 1991.
Fred Chow and John L. Hennessey, The Priority-Based Coloring Approach to Register Allocation, ACM Transactions on Programming Languages and Systems, vol. 12, No. 4, Oct. 1990, pp. 501-536.
Preston Briggs, Register Allocation Via Graph Coloring, Rice COMP TR92-183, Department of Computer Science, Rice University, P.O. Box 1892, Houston, Tex. 77251-1892.
Callahan, et al., "Register Allocation Via Hierarchical Graph Coloring", 1991.
Steenkiste, "Lisp On A Reduced-Instruction-Set Processor: Characterization and Optimization"; Ph.D. Thesis, Stamford University; 1989; Chapter 5.
Callahan, et al., "Register Allocation Via Tiling"; Tera Computer Co.; 1990.

Primary Examiner—Kevin A. Kriess
Assistant Examiner—Jonathan Hall Backenstose
Attorney, Agent, or Firm—Blakely Sokoloff Taylor & Zafman

[57] ABSTRACT

During code generation, a routine is first decomposed into regions. Then, starting from the highest plateau, i.e. the inner most control flow level, the interference graph of each region in a plateau is colored individually. Neighboring regions of the plateau are then combined by connecting the colored nodes of the interference graphs that are live at region boundaries. If connecting the interference graphs render the connected interference graph uncolorable, colored nodes that are live at region boundaries are connected by introducing register to register move or spilling the node. When all neighboring regions of a plateau are combined, the plateau collapses into a region of the lower level plateau. The process is repeated until all plateaus are collapsed and the regions of the base plateau are colored and combined together. Registers are then allocated to the colored nodes.

10 Claims, 11 Drawing Sheets

```
extern int
random_number ();                               100
main (
     int x)         ⎫ 102
{                   ⎬
     int A,B,C;     ⎭
     loopA:    A = random_number ();   ⎫ 104
               if (A != x) go to loopA; ⎭
     loopB:    B = random_number ();   ⎫ 106
               if (B != x) go to loopB; ⎭
     loopC:    C = random_number ();   ⎫ 108
               if (C != A) go to loopC; ⎭
}
```
Figure 1
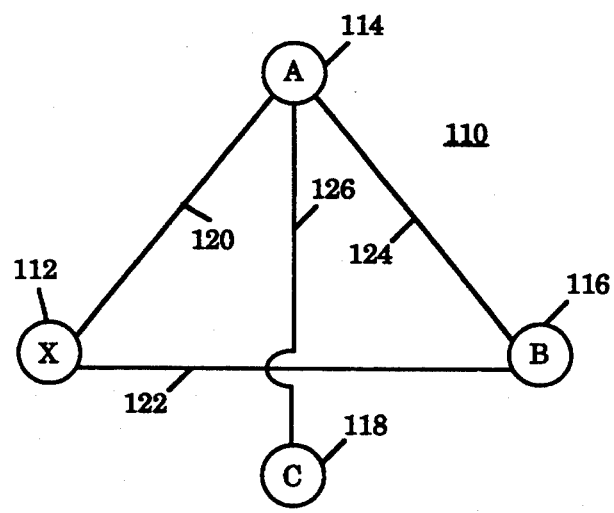
Figure 2
*Prior Art*
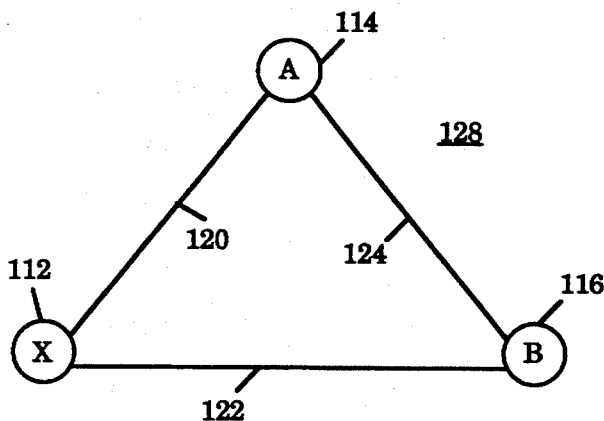
Figure 3
*Prior Art*

```
extern int
random_number ();
main (
    int x)          } — 102                    100'
{
    int A,B,C;      }
    spill x to memory;
    loopA:    A = random_number ();    }
              reload x' from memory;    } — 104'
              if (A != x') go to loopA; }
    loopB:    B = random_number ();    }
              reload x" from memory;    } — 106'
              if (B != x") go to loopB; }
    loopC:    C = random_number ();    } — 108
              if (C != A) go to loopC;  }
}
```
Figure 4
*Prior Art*
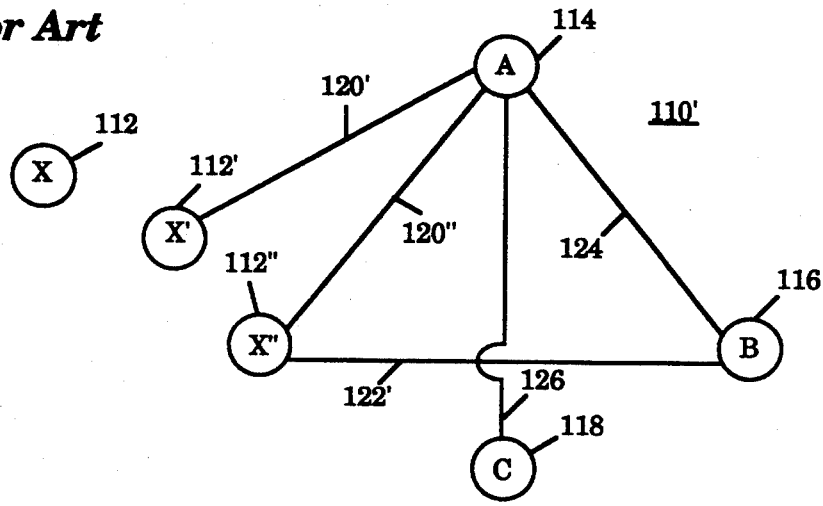
Figure 5
*Prior Art*
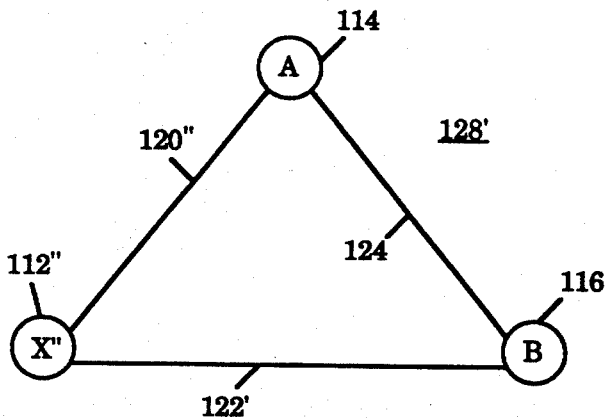
Figure 6
*Prior Art*

```
extern int
random_number ();
main (
      int x)         ⎫ 102                     100"
{
      int A,B,C;     ⎭
      spill x to memory;
      loopA:     A = random_number ();   ⎫
                 reload x' from memory;  ⎬ 104
                 if (A != x) go to loopA;⎭
      loopB:     B = random_number ();   ⎫
                 spill B to fmemory;     ⎪
                 reload x" from memory;  ⎬ 106"
                 reload B' from memory;  ⎪
                 if (B != x) go to loopB;⎭
      loopC:     C = random_number ();   ⎫ 108
                 if (C != A) go to loopC;⎭
}
```
Figure 7
*Prior Art*
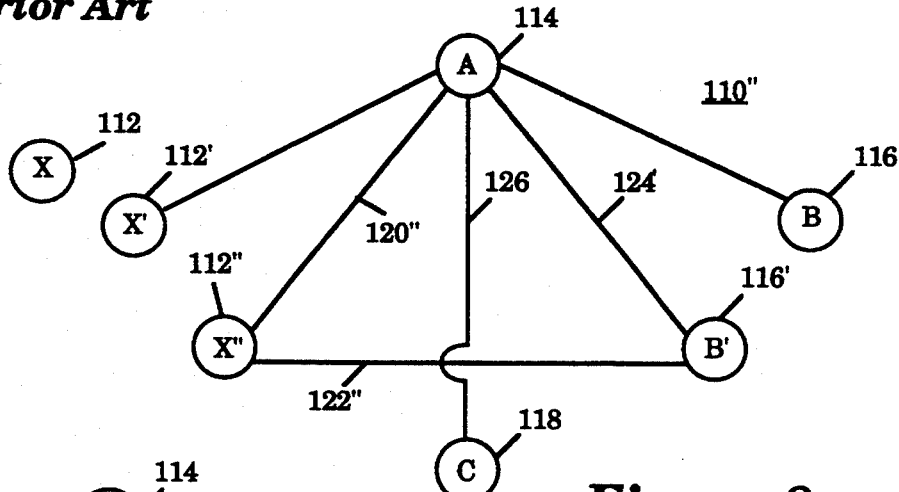
Figure 8
*Prior Art*
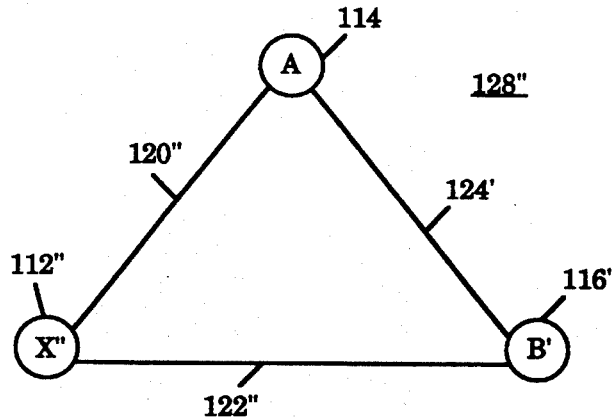
Figure 9
*Prior Art*

```
extern int
random_number ();

main (
    int x)          ⎫ 102
{
    int A,B,C;      ⎭ spill x to memory;
    loopA:   A = random_number ();    ⎫
             spill A to memory;        ⎪ 104"
             reload x' from memory;    ⎬
             reload A' from memory;    ⎪         100'''
             if (A != x) go to loopA;  ⎭ loopB:   B = random_number ();    ⎫
             spill B to fmemory;       ⎪ 106"
             reload x" from memory;    ⎬
             reload B' from memory;    ⎪
             if (B != x) go to loopB;  ⎭ loopC:   C = random_number ();    ⎫
             reload A" from memory     ⎬ 108'
             if (C != A) go to loopC;  ⎭
}
```

```
extern int
random_number ();

main (
      int x)           }  102              100''''
{
      int A,B,C;       } loopA:    A = random_number ();    } 104
                if (A != x) go to loopA;  } spill A to memory;
      loopB:    B = random_number ();    } 106'''
                if (B != x) go to loopB;  } reload A' from memory;
      loopC:    C = random_number ();    } 108''
                if (C != A) go to loopC;  }

}
```

REGISTER ALLOCATION BY DECOMPOSING, RE-CONNECTING AND COLORING HIERARCHICAL PROGRAM REGIONS

BACKGROUND OF THE INVENTION

1. Field of the Invention

The present invention relates to the field of computer systems, in particular, programming language compilers used on these computer systems. More specifically, the present invention relates to register allocation methods for code generation employed by the programming language compilers.

2. Background

Today, many high level programming language compilers employ graph coloring to allocate registers during code generation to minimize the number of register spills in the generated code. A register spill occurs when it is necessary to insert instructions in the generated code to store the content of a register into a memory location in order to free up the register for allocation to a computation, because all registers are in use.

Typically a two pass approach is used to allocate register by graph coloring. In the first pass, target machine instructions are generated as though there were an infinite number of registers. The instructions are generated with symbolic registers. Additionally, quantities that assist instruction access to variables, such as stack pointers, display pointers, and base registers, are assumed to be stored in reserved registers. For more complex instructions, where the access assist quantities do not directly translate into an access mode for the addresses mentioned in the instructions, they are decomposed into several instructions using one or more symbolic registers.

In the second pass, physical registers are assigned to the symbolic registers. To do so, a register interference graph is constructed for each procedure in which the nodes are the symbolic registers and two nodes are connected with an edge if one symbolic register is live at a point where the other is defined. Each graph is then colored using k colors, where each color represents an assignable physical register and k equals the number of assignable physical registers. A graph is colored when each node is assigned a color, and no two adjacent nodes have the same color.

To color a graph, a node with less than k edges is removed from the graph. The step is repeated until the graph becomes empty or all remaining nodes in the graph have k or more edges. if the graph is non-empty, instructions are inserted to spill one of the node with k or more edges, and the graph is modified accordingly. The node removal process is then repeated for the modified graph. This process of spilling one of node with k or more edges, modifying the graph and repeating the node removal process is repeated until the node removal process is successful in emptying one of the modified graphs. Once the graph or its progeny becomes empty, the nodes are colored in reverse order of their removal with each node being assigned a color that has not been assigned to one of its adjacent neighbors.

This traditional approach of allocating registers by graph coloring can and often produces sub-optimal register allocation for certain important code sequences of a routine. Consider the exemplary routine 100 illustrated in FIG. 1, it comprises four exemplary variables; x, A, B, and C, 102, and three exemplary loops, IoopA, IoopB, and IoopC, 104–108. For ease of understanding, assume that there are only two registers available for allocation. As described earlier, to allocate these two registers using traditional graph coloring, an interference, graph 110, FIG. 2, is first constructed for the exemplary routine. The interference graph 110 comprises four nodes, x, A, B, and C, 112–118, and four edges, xA, xB, AB, and AC, 120–126.

Since node C 118 has less than two edges, it can be colored and removed from the interference graph 110, resulting in the new interference graph 128 of FIG. 3. This new interference graph 128 now has three nodes, x, A and B, 112–116, and three edges 120–124. Since node x, node A and node B, 112–116 all have two edges, none of them can be colored and removed. As described earlier, one of the node, x, A or B, 112, 114 or 116, will have to be spilled. Using a fairly common spilling heuristic where references are counted and weighted by loop depth, more specifically, each basic reference has a weight of one, and each reference within a loop has a weight of 100, either node x 112 or node B 116 will be selected, since node x and node B are tied, each having a weight of 200, and node A has a weight of 300.

Assuming node x 112 is spilled, the routine 100' is modified with code 104' and 106' to save x into memory and reload x from memory as illustrated in FIG. 4. The modified routine 100' now has three instances of variable x (x, x' and x"), and one instance each for variables A, B, and C. The interference graph 110' of the modified routine is illustrated in FIG. 5, it has six nodes, x, x', x", A, B, and C, 112, 112', 112", 114–118, and five edges, x'A, x"A, x"B, AB, and AC, 120', 120", 122', 124 and 126. The sub-optimal register allocation being illustrated will also occur if B is spilled instead.

Since nodes x, x', and C, 112, 112', and 118, all have less than two edges, they can be colored and removed from the interference graph 110', resulting in the new interference graph 128' of FIG. 6. This new interference graph 128' now has three nodes, x", A and B, 112", 114 and 116, and three edges 120", 122', and 124. Since node x", node A and node B, 112", 114, and 116 all have two edges, none of them can be colored and removed. Once again, one of the node, x", A or B, 112", 114 or 116, will have to be spilled. Using the same spill heuristic described earlier, B will be selected, since B has the greatest weight.

The routine 100" is again modified with code 106" to save B into memory and reload B from memory as illustrated in FIG. 7. The twice modified routine 100" now has three instances of variable x (x, x' and x"), two instances of variable B (B, and B'), and one instance each for variables A and C. The interference graph 110" of the twice modified routine is illustrated in FIG. 8, it has seven nodes, x, x', x", A, B, B', and C, 112, 112', 112", 114, 116, 116', and 118, and five edges, x'A, x"A, x"B', AB, AB', and AC, 120', 120", 122", 124, 124' and 126.

Since nodes x, x', B, and C, 112, 112', 116, and 118, all have less than two edges, they can be colored and removed from the interference graph 110", resulting in the new interference graph 128' of FIG. 9., This new interference graph 128" now has three nodes, x", A and B', 112", 114 and 116', and three edges 120", 122", and 124'. Since node x", node A and node B', 112", 114, and 116' all have two edges, none of them can be colored and removed. Once again, one of the node, x", A or B', 112", 114 or 116", will have to be spilled. Using the same spill heuristic described earlier, A will be selected, since A has the greatest weight.

The routine 100''' is again modified with code 104'' and 108' to save A into memory and reload A from memory as illustrated in FIG. 10. The thrice modified routine 100''' now has three instances each of variables x (x, x' and x") and A (A', A" and A'''), two instances of variable B (B, and B'), and one instance of variable C. The interference graph 128''' of the thrice modified routine is illustrated in FIG. 11, it has nine nodes, x, x', x", A, A', A", B, B", and C, 112, 112', 112'', 114, 114', 114'', 116, 116', and 118, and three edges, x'A', x"B', A"C, 120''', 122'', and 126'.

The sub-optimal register allocation illustrated is representative of many industry applications implemented in a high level programming language, such as C, C++, Fortran or Ada. Thus, it is desirable to be able to allocate registers for a routine; with reduced likelihood of producing sub-optimal register allocations for important code sequences of a routine. As will be disclosed, the present invention provides a method and apparatus for allocating registers by region based color graphing, which achieves the object and desired result described above.

For further description of register allocation by graph coloring, see G. J. Chaitin, *Register Allocation and Spilling via Graph Coloring*, U.S. Pat. Ser. No. 4,57,678, and A. V. Aho, R. Sethi, and J. D. Ullman, *Compilers. Principles, Techniques, and Tools*, Addison and Wesley, 1986, pp. 541–545.

SUMMARY OF THE INVENTION

A method and apparatus for allocating registers by region based color graphing is disclosed. The present invention has particular application to code generation performed by compilers of high level programming languages. Under the present invention, a routine is first decomposed into regions. Regions are non-overlapping groups of one or more basic blocks. There are three types of regions. A region is either a SUBSUME, JOIN, or MERGE region. Neighboring regions of the same control flow level form a plateau with the neighboring regions of the inner most control flow level forming the highest plateau, and the enclosing regions of the outer control levels forming the lower plateaus. Enclosing regions of the outer most control level form the base plateau.

Then, starting from the highest plateau, the interference graph of each region in a plateau is colored individually. Neighboring regions of the plateau are then combined by connecting the colored nodes that are live at region boundaries. If the colored nodes that are live at region boundaries cannot be connected such that the interference graph remains colorable, then the conflicts are resolved by introducing register to register move or spilling the node. When all neighboring regions of a plateau are combined, the plateau collapse into a region of the lower level plateau. The process is repeated until the regions of the base plateau sire colored and combined together. Registers are then allocated to the colored nodes.

BRIEF DESCRIPTION OF THE DRAWINGS

The objects, features, and advantages of the present invention will be apparent from the following detailed description of the preferred embodiment of the invention with references to the drawings in which:

FIG. 1 shows an exemplary routine.

FIGS. 2–11 illustrate how registers are allocated sub-optimally for the exemplary routine of FIG. 1 under traditional register allocation by graph coloring.

DETAILED DESCRIPTION PRESENTLY PREFERRED AND ALTERNATE EMBODIMENTS

A method and apparatus for region based register allocation is disclosed. The method and apparatus has particular applications to high level programming language compilers of computer systems. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 12:
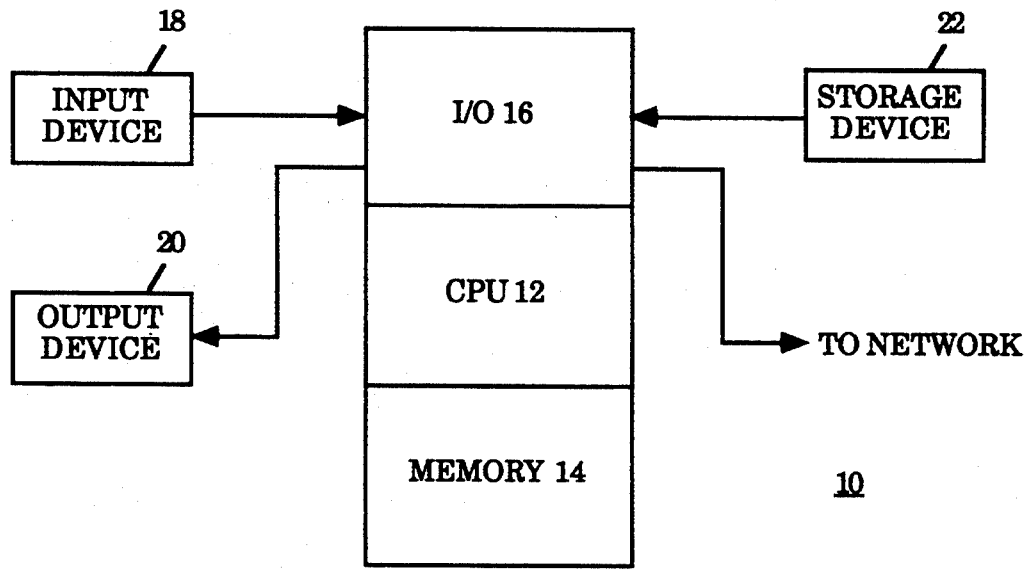
FIGS. 12–13 illustrate the hardware and software elements of a computer system comprising a high level language compiler incorporating the teachings of the present invention.
Figure 13:
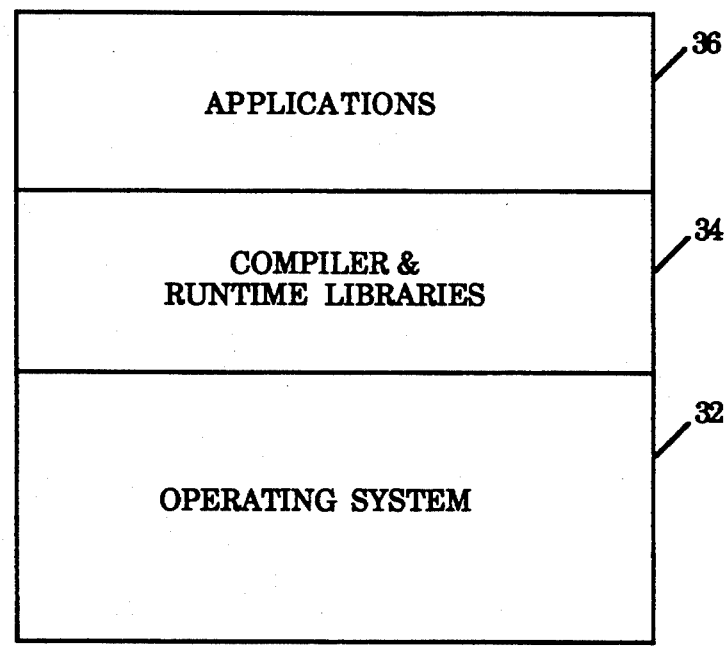

Referring now to FIGS. 12–13, two functional block diagrams illustrating the hardware and software elements of a computer system comprising a high level programming language compiler that incorporates the teachings of the present invention is shown. Shown in FIG. 12 is a computer 10 comprising a central processing unit (CPU) 12, a memory 14, and an I/O module 16. Additionally, the, computer system 10 also comprises an input device 18, an output device 20 and a storage device 22. The CPU 12 is coupled to the memory 14 and the I/O module 16. The input device 18, the output device 20, and the storage device 22 are also coupled to tile I/O module 16. The I/O module 16 in turn is coupled to a network.

Except for the manner they are used to practice the present invention, the CPU 12, the memory 14, the I/O module 16, the input device 18, the output device 20, and the storage device 22, are intended to represent a broad category of these elements found in most computer systems. In particular, the CPU 12 comprises a number of registers. The constitutions and basic functions of these elements are well known and will not be further described here.

Shown in FIG. 13 is a high level programming language compiler and its runtime libraries 34 incorporating the teachings of the present invention. Also shown is an operating system 32 providing system services to the compiler and the runtime libraries, and the applications 36 compiled. The applications 36 are intended to represent a broad categories of applications found in many computer systems, and will not be described further. The runtime libraries 34 and the operating system 32 are also intended to represent a broad category of these system software found in most computer systems and will not be described further. The high level programming language compiler 34 will be described in further detail below with references to FIGS. 14–16d.

Figure 14:
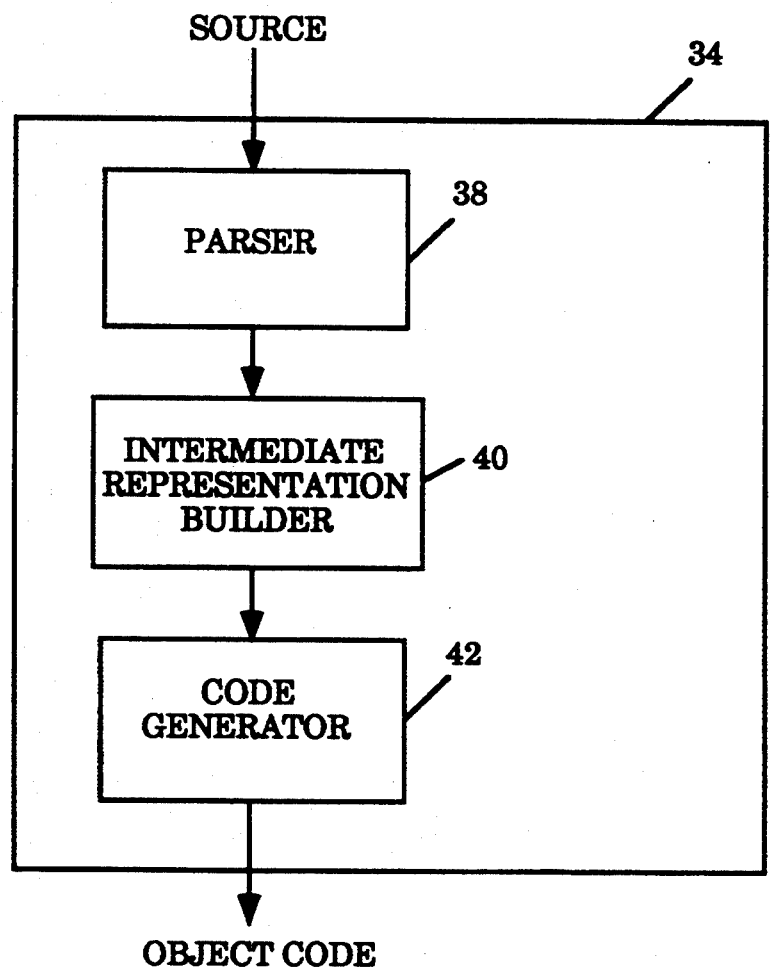
FIG. 14 shows a functional diagram of one embodiment of the high level language compiler of FIG. 13.

Referring now to FIG. 14, a functional block diagram illustrating one embodiment of the high level language compiler of FIG. 13 is shown. Shown is the high level language compiler comprising a parser 38, an intermediate representation builder 40, and a code generator 42 incorporating the teachings of the present invention. These elements are sequentially coupled to each other. Together, they generate executable code, in response to received source code.

The parser 38 receives application source code as inputs, and tokenizes the various expressions in the application source code. The intermediate representation builder 40 receives the tokenized expressions as inputs, and generates intermediate representations for these expressions. The code generator 42 receives the intermediate representations as inputs, and generates executable code, including allocating registers. The code generator 42 allocates registers using the region based graph coloring method of the present invention.

The parser 38, the intermediate representation builder 40, and the code generator 42, except for the method employed by the code generator 42 to perform register allocation, are implemented in like manners similar to a broad category of equivalent elements found in many well known programming language compilers. Their constitutions, basic functions offered, and operation flows will not be described further. The region based graph coloring method of register allocation of the present invention employed by the code generator 42 will be described in further detail with references to FIGS. 15–16d.

For further descriptions on various parsers, intermediate representation builders, and code generators, see A. V. Aho and J. D. Ullman, *Compiler, Principles, Techniques, and Tools*, Addison-Wesley, 1985, pp. 146–388, and 463–584.

Figure 15:
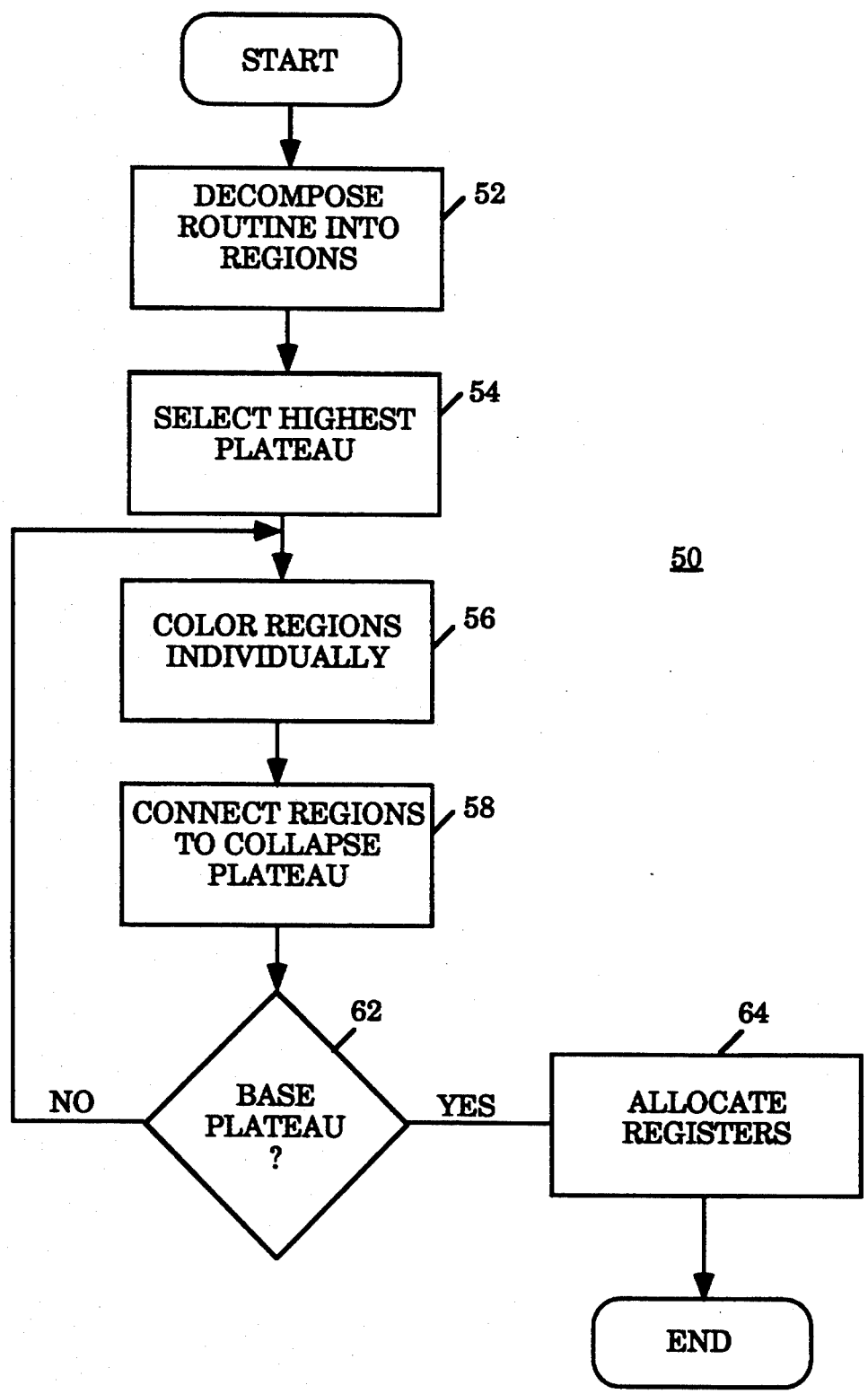
FIG. 15 shows a flow diagram for the region based register allocation method of the present invention.
Figure 16A:
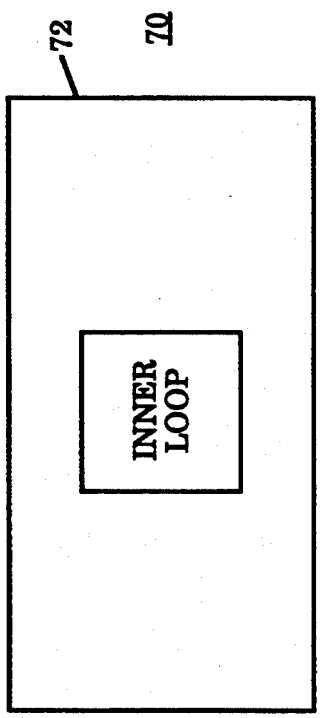
FIG. 16 illustrates the different types of regions of the present invention.
Figure 16B:
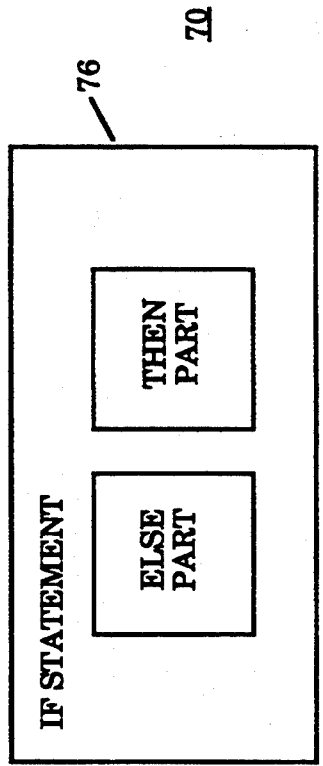
Figure 16C:
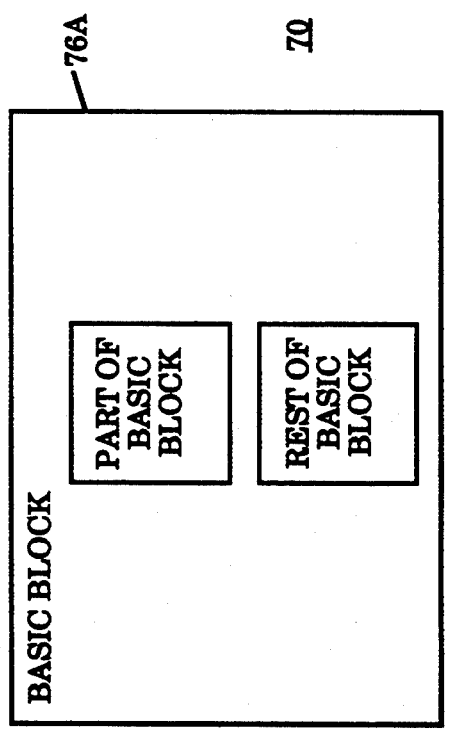
Figure 16D:
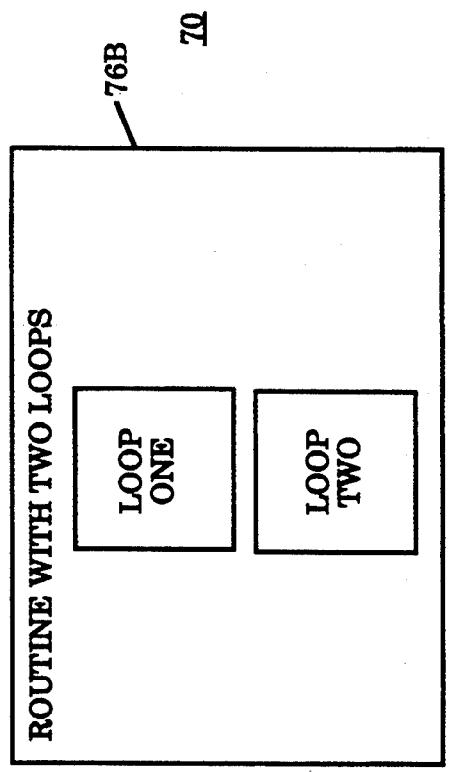
Figure 17:
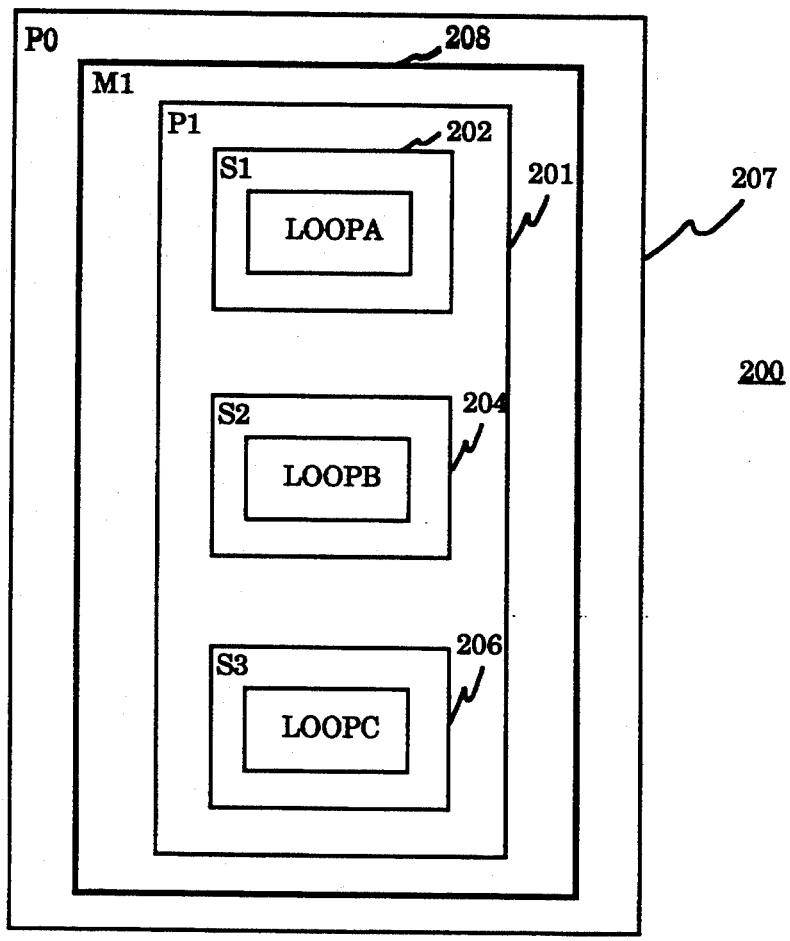
FIG. 17 illustrates the region decomposition of the exemplary routine of FIG. 1.

Referring now to FIG. 15, a flow diagram illustrating the method of the present invention for allocating registers by region based graph coloring is shown. As shown in FIG. 15, the first step is to decompose each routine into regions, block 52. A routine may be decomposed into its regions using a number of well known approaches, including hierarchical reduction of a routine's control flow graph.

Under the present invention, a region is defined to be non-overlapping groups of one or more basic blocks. A basic block is a sequence of consecutive statements in which flow of control enters at the beginning and leaves at the end without halt or possibility of branchings except at the end. Since a basic block may in general be decomposed into smaller basic blocks, a region can be just a part of a larger basic block. Thus, there are three type of regions, Subsume, Join, and Merge, as illustrated in FIG. 16a–16d. A Subsume region 72 is a composite region comprising an inner loop enclosed by an outer loop. A Join region 76 is a composite region comprising the different parts of conditional statements, i.e. If-Then-Else, Switch or Case statements. A Merge region 76a or 76b, is a composite region comprising the different parts of a basic block, 76a, or a number of independent loops 76b.

Additionally, neighboring regions of the same control flow level form a plateau, with the neighboring regions of the inner most control flow level forming the highest plateau, and the enclosing regions of the outer control levels forming the lower plateaus. Enclosing regions of the outer most control level form tile base plateau. Regions that do not enclose nested regions are; also known as the leaf regions.

Referring back to FIG. 15, after decomposing a routine into its regions, block 52, the highest plateau is selected, block 54. The interference graph of the regions in the highest plateau are colored individually using a traditional graph coloring method, block 56. Then the interference graphs of the regions are connected together to collapse the plateau into a region of the next lower level plateau, block 58.

The interference graph of the regions are connected together at the colored nodes that are live crossing the region boundaries. If the colored nodes that are live at region boundaries cannot be connected such that the interference graph remains colorable, then the conflicts are resolved by introducing register to register move or spilling the node. If a colored node is live crossing a region boundary and is referenced in both regions, then the two interference graphs are connected by the addition of a register to register move along the control flow edge connecting the, regions. If a colored node is live crossing a region boundary, but is not referenced in both regions (i.e. pass through in at least one of the regions), then the two interference graphs are connected by the addition of a spill along the control flow edge connecting the regions. In either case, coloring of the interference graphs of the regions are preserved.

Still referring to FIG. 15, the coloring and connecting steps, blocks 56 and 58, are repeated until all plateaus are collapsed and the regions in the base plateau are connected. Then, registers are allocated to the colored nodes, block 64.

While logically the register allocation method of the present invention has been described with iterative process steps starting from the highest plateau to the lowest plateau, it will be appreciated that the coloring of leaf regions, whether they are on the same plateau, in actuality may be accomplished in parallel on a computer system with multiple processors, thereby reducing the time it takes to find a coloring for the interference graphs of these regions. Additionally, since the colored nodes internal to a given region remain colored once they are colored, their edges with external nodes may be summarized in an edge count on the external nodes, and the colored internal nodes may then be removed from the interference graph. Thus, the combined size of the regional interference graphs will never be greater than the global interference graph, and nearly always much smaller. Therefore, if parallelism is not exploited, the combined size of the; regional interference graphs can be further exploited to reduce the amount of memory required to find a coloring for the interference graphs of these regions, by connecting regions whenever possible before coloring another.

Referring now to FIGS. 17–23, seven diagrams illustrating how registers are advantageously allocated for the exemplary routine of FIG. 1 under the method of the present invention are shown. Recall that the exemplary routine 100 of FIG. 1 comprises four exemplary variables x, A, B, and C, 102, and three exemplary loops, IoopA, IoopB, and IoopC, 104–108. Again, assume that there are only two registers available for allocation. As described earlier, under the present invention, the exemplary routine 100 is first decomposed into regions, resulting in the region decomposition 200 illustrated in FIG. 17. The region decomposition comprises three subsume regions, s1-s3, 202-206, and one merge region m1 208. The three neighboring subsume regions, s1-s3, 202-206, form the second and highest level plateau p1 201. The single merge region m1 208 forms the first and lowest level plateau p0 207, also known as the base plateau.

Figure 18:
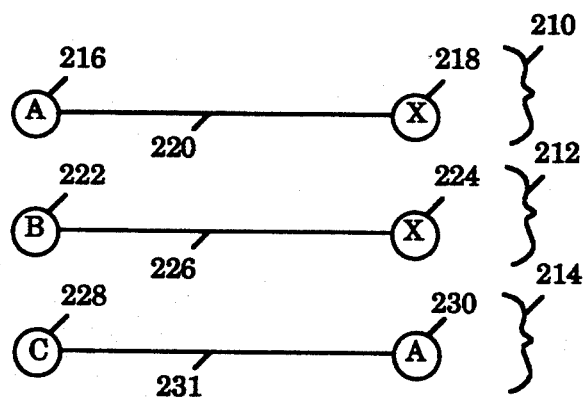
FIGS. 18–23 illustrate how registers are allocated advantageously for the exemplary routine of FIG. 1 under the method of the present invention.

The three neighboring subsume regions, s1-s3, 202-206, of the highest plateau are first colored individually. The interference graphs for the three neighboring subsume regions, s1-s3, 202-206, are illustrated in FIG. 18. In each case, the interference graph, 210, 212, or 214 comprises two nodes and one edge, i.e. nodes A and x, 216 and 218, with edge Ax 220, nodes B and x, 222 and 224, with edge Bx 226, or nodes C and A, 228 and 230, with edge CA 231. Thus, in each case, the nodes can be colored, since they all have less than two edges.

Figure 19:
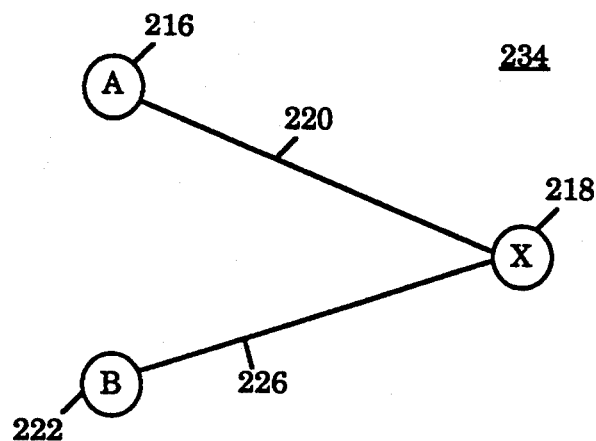

The individually colored subsume regions s1-s3 are then connected together to collapse the second and highest level plateau p1. To connect these individually colored subsume regions s1-s3, the interference graph 210 of the colored first subsume region s1 is first connected to the interference graph 212 of the colored second subsume region s2 at the node that is live across both colored subsume regions s1-s2, i.e. node x, 218 or 224. The resulting combined interference graph is illustrated in FIG. 19. The combined interference graph 234 of the first two colored subsume regions s1-s2 comprises three nodes, A, x, and B, 216, 218, and 222, and two edges, Ax and Bx, 220 and 226. Although node A 216 is live through the second colored subsume region s2, it does not appear in the second colored subsume region s2. Since adding the necessary edge to connect nodes A and B, 216 and 222, would render the combined interference graph 234 uncolorable, node A is spilled instead.

Figure 20:
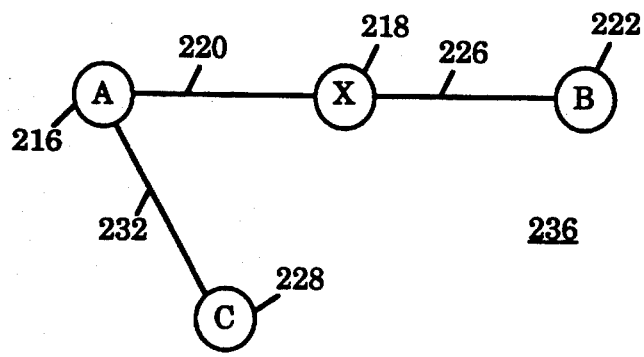
Figure 21:
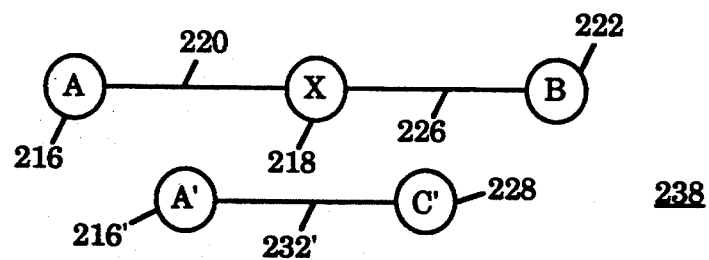

Next, the combined interference graph 234 of the combined first and second colored subsume regions s1-s2 is connected the interference graph of the third colored subsume region s3 at the node that is live across the combined first and second colored subsume regions s1-s2 and the third colored subsume region s3, i.e. node A 216, resulting in the new combined interference graph 236 of FIG. 20. The combined interference graph 236 of the three colored subsume regions s1-s3 comprises four nodes, A, x, B, and C, 216, 218, 222, and 228, and three edges, Ax, Bx, and AC, 220, 226, and 232. Since node A 216 is live coming into the third colored subsume region s3, but not present in the second colored subsume region s2, a reload of a second instance of A is added, resulting in the modified combined interference graph 238 of FIG. 21. The modified combined interference graph 238 comprises five nodes A, A', x, B, and C, 216, 216', 218, 222, and 228, and three edges, Ax, Bx, and A'C, 220, 226 and 232'. Since all nodes have less than two edges, the combined region remains colorable.

Figures 10, 11:
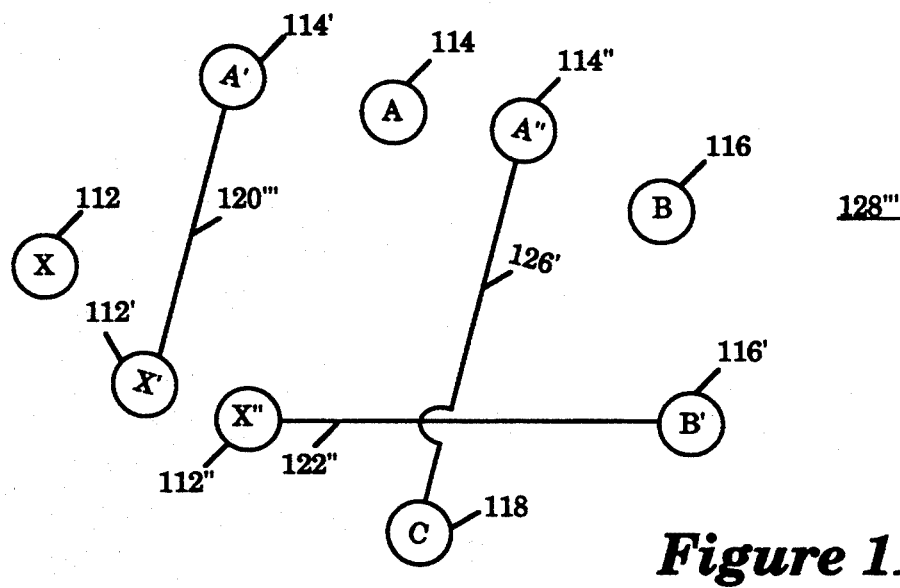
Figures 22, 23:
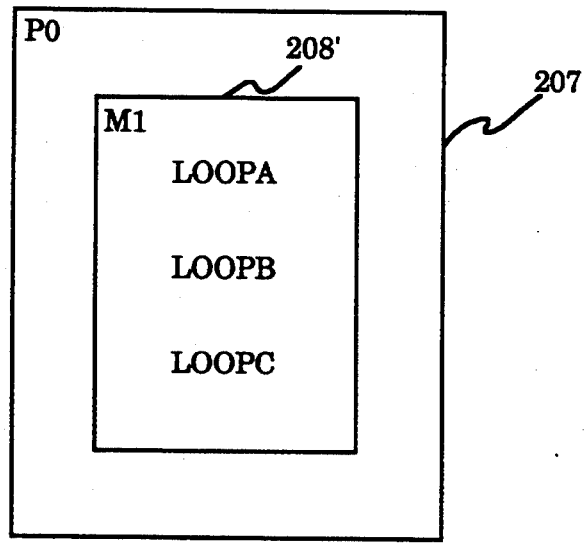

Once the three colored subsume regions s1-s3 of the second and highest plateau p1 is combined, the second and highest plateau p1 collapses leaving only a merged region 208' in the base plateau p0 207, as illustrated in FIG. 22. Thus, the two registers have been successfully allocated to the exemplary routine of FIG. 1. The modified exemplary routine resulted from advantageously allocating the two registers under the method of the present invention is illustrated in FIG. 23. The execution flow of the modified exemplary routine 100''' of FIG. 23 is significantly more efficient than the execution flow of the modified exemplary routine 100''' of FIG. 10 resulted from the prior art approach.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system comprising a CPU and a plurality of registers coupled to said CPU for executing a high Level language compiler and program routines compiled by said compiler, a method for said compiler to allocate registers for a program routine during code generation while compiling said program routine, said method comprising the steps of:
    a) decomposing said program routine into regions, said regions comprising non-overlapping basic blocks of said program routine, said regions having three distinct types, a Subsume type, a Join type and a Merge type, said Subsume type regions being regions comprising inner and outer loops of said program routine, said Join type regions being regions comprising parts of conditional statements of said program routine, said Merge type regions being regions comprising a selected one of (i) parts of a basic block, and (ii) independent loops, of said program routine;
    b) constructing interference graphs of said regions individually, said interference graphs comprising nodes representing variables and edges connecting said nodes representing conflicts between said nodes, two nodes are connected by an edge if the two variables represented by nodes cannot simultaneously share a register at some point in the program routine;
    c) coloring the interference graphs of said regions
    d) connecting said colored interference graphs of said regions, each pair of said interference graphs being connected at colored nodes that are live over region boundaries of said regions; and
    e) repeating steps (c) and (d) until a composite interference graph representing the entire routine is connected and colored
    f) allocating registers to colored nodes of said composite interference graph.

2. The method as set forth in claim 1, wherein, said program routine is decomposed into regions in said step a) using a hierarchical reduction algorithm.

3. The method as set forth in claim 1, wherein,
    said program routine comprises a plurality of nested control flow levels;
    said steps b) and c) being repeated for each of said nested control flow level starting with the inner most control flow level to the outer most control flow level, each of said control flow level, except the outer most control flow level, collapsing into a region of the next outer control flow level when its regions' colored interference graphs are connected in said step c).

4. The method as set forth in claim 3, wherein, if connecting said interference graphs at said live colored nodes renders said connected interference graph uncolorable, said interference, graphs are connected as follows:

if a live colored node is referenced in both regions, said interference graphs are connected by adding a register to register move to avoid a register spill at said live colored node; and if a live colored node is not referenced in both regions, said interference graphs of said regions are connected by adding a register spill into memory at said colored node.

5. The method as set forth in claim 3, wherein, said computer system comprises a plurality of parallel processors;

said regions comprise regions of at least two types, a Join type and a Merge type, said Join type regions being regions comprising parts of conditional statements of said program routine, said Merge type regions being regions comprising a selected one of (i) parts of a basic block, and (ii) independent loops, of said program routine; and said interference graphs of said regions having a region type of a selected one of said Merge and said Join type are colored individually in parallel, regardless which control flow levels said Merge and Join regions are located.

6. In a computer system comprising a central processing unit (CPU) and a plurality of registers coupled to said CPU for executing a high level language compiler and program routines compiled by said compiler, a code generator of said compiler for allocating registers for a program routine during code generation while compiling said program routine, said code generator comprising:

a) decomposing means for decomposing said program routine into regions, said regions comprising non-overlapping basic blocks of said program routine, said regions having three distinct types, a Subsume type, a Join type and a Merge type, said Subsume type regions being regions comprising inner and outer loops of said program routine, said Join type regions being regions comprising parts of conditional statements of said program routine, said Merge type regions being regions comprising a selected one of (i) parts of a basic block, and (ii) independent loops, of said program routine;

b) coloring means coupled to said decomposing means for constructing and coloring interference graphs of said regions individually, said interference graphs comprising nodes representing variables, and edges connecting said nodes representing conflicts between said registers, wherein two nodes are connected by an edge if the two variables represented by nodes cannot simultaneously share a register during execution of the program routine;

c) connecting means coupled to said coloring means for connecting said colored interference graphs of said regions, each pair of said interference graphs being connected at colored nodes that are live over region boundaries of said regions; and d) allocating means coupled to said connecting means for allocating registers to colored nodes of said connected interference graphs.

7. The code generator as set forth in claim 6, wherein, said decomposing means decomposes said program routine into regions using an hierarchical reduction algorithm.

8. The code generator as set forth in claim 6, wherein, said program routine comprises a plurality of nested control flow levels;

said coloring and connecting means repeats said coloring and said connecting for each of said nested control flow level starting with the inner most control flow level to the outer most control flow level, each of said control flow level, except the outer most control flow level, collapsing into a region of the next outer control flow level when its regions' colored interference graphs are connected.

9. The code generator as set forth in claim 8, wherein, if connecting said interference graphs at said live colored nodes render said connected interference graph uncolorable, said coloring and connecting means connects and colors said interference graphs as follows:

if a live colored node is referenced in both regions, said connecting means connects said interference graphs by adding a register to register move to avoid a register spill at said live colored node; and if a live colored node is not referenced in both regions, said connecting means connects said interference graphs by adding a register spill into memory at said live colored node.

10. The code generator as set forth in claim 8, wherein, said computer system comprises a plurality of parallel processors;

said regions comprise regions of at least two types, a Join type and a Merge type, said Join type regions being regions comprising parts of conditional statements of said program routine, said Merge type regions being regions comprising a selected one of (i) parts of a basic block, and (ii) independent loops, of said program routine; and said coloring means colors said interference graphs of said regions having a region type of a selected one of said Merge and said Join type in parallel, regardless which control flow levels said Merge and Join regions are located.

* * * * *